(12) United States Patent
Robertson

(10) Patent No.: US 8,575,928 B2
(45) Date of Patent: Nov. 5, 2013

(54) OPTICAL SENSOR

(75) Inventor: Douglas A. Robertson, Greer, SC (US)

(73) Assignee: Transtech of South Carolina, Piedmont, SC (US)

(*) Notice: Subject to any disclaimer, the term of this patent is extended or adjusted under 35 U.S.C. 154(b) by 406 days.

(21) Appl. No.: 13/049,017

(22) Filed: Mar. 16, 2011

(65) Prior Publication Data

US 2012/0235671 A1    Sep. 20, 2012

(51) Int. Cl.
*G01R 33/02*    (2006.01)

(52) U.S. Cl.
USPC ....................................... 324/244.1

(58) Field of Classification Search
USPC ....................................... 324/244.1
See application file for complete search history.

(56) References Cited

U.S. PATENT DOCUMENTS

| | | | |
|---|---|---|---|
| 3,787,703 A * | 1/1974 | Topol | 250/574 |
| 4,506,339 A * | 3/1985 | Kuhnlein | 702/146 |
| 4,746,791 A | 5/1988 | Forkel | |
| 5,278,499 A * | 1/1994 | Ito et al. | 324/244.1 |
| 5,719,497 A * | 2/1998 | Veeser et al. | 324/174 |

* cited by examiner

*Primary Examiner* — Reena Aurora
(74) *Attorney, Agent, or Firm* — Dority & Manning, PA

(57) ABSTRACT

A sensor that includes an actuator having a plurality of actuator magnets. A detector proximate to and mechanically isolated from the actuator defines a bore. A detector magnet inside the bore may move in the bore from a first position to a second position. An optical signal passes through the detector so that the detector magnet blocks the optical signal when the detector magnet is in the first position.

20 Claims, 4 Drawing Sheets

OPTICAL SENSOR

FIELD OF THE INVENTION

The present invention generally involves a sensor. Specifically, embodiments of the present invention include an optical sensor in a water resistant chamber.

THE BACKGROUND OF THE INVENTION

Numerous sensors are known in the art for detecting the position or relative movement of an object. The sensors are often exposed to harsh environments and must therefore be capable of reliably operating after long periods of exposure to extreme heat, cold, water, vibration, and/or electromagnetic interference. In addition, the sensors may be located in explosive or highly flammable environments that preclude the use or presence of anything that may produce a spark or other ignition source.

The advent of fiber optics in sensors has allowed for the development of spark-free or combustion-free sensors that are less susceptible to electromagnetic interference. However, the need still exists for a sensor, such as an optical sensor, that can reliably operate for extended periods in harsh environments.

BRIEF DESCRIPTION OF THE INVENTION

Aspects and advantages of the invention are set forth below in the following description, or may be obvious from the description, or may be learned through practice of the invention.

One embodiment of the present invention is a sensor that includes an actuator having a plurality of actuator magnets. A detector proximate to and mechanically isolated from the actuator defines a bore. A detector magnet inside the bore may move in the bore from a first position to a second position. An optical signal passes through the detector so that the detector magnet blocks the optical signal when the detector magnet is in the first position.

Another embodiment of the present invention is a sensor that includes a first water resistant chamber and an actuator at least partially inside the first water resistant chamber. The actuator includes a plurality of actuator magnets. A second water resistant chamber is adjacent to the first chamber, and a detector at least partially inside the second chamber and mechanically isolated from the actuator defines a bore. A detector magnet inside the bore move in the bore from a first position to a second position. An optical signal passes through the inside of the second chamber, and the detector magnet blocks the optical signal when the detector magnet is in the first position.

In another embodiment of the present invention, a sensor may include a casing that defines first and second water resistant chambers. An actuator at least partially inside the first water resistant chamber includes a plurality of actuator magnets. A detector at least partially inside the second water resistant chamber and mechanically isolated from the actuator defines a bore. A detector magnet inside the bore may move in the bore from a first position to a second position. An optical signal passes through the inside of the second chamber, and the detector magnet blocks the optical signal when the detector magnet is in the first position.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
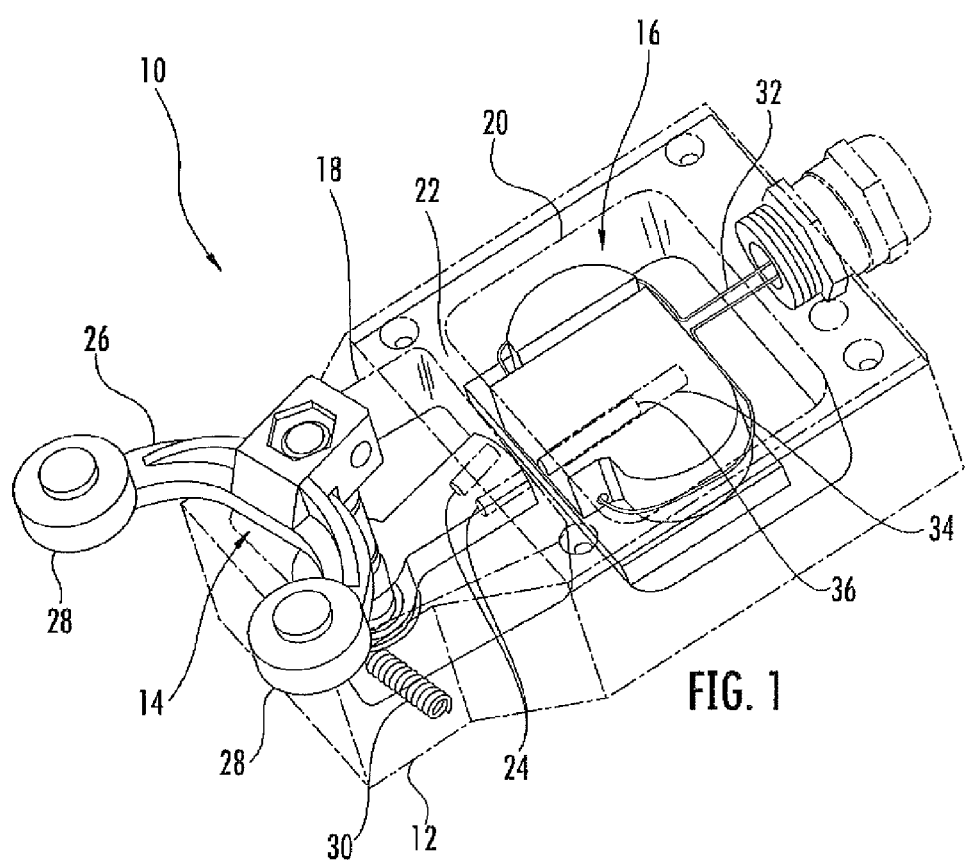
FIG. 1 is a perspective view of a sensor according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a perspective view of a sensor 10 according to one embodiment of the present invention. The sensor 10 may be used to detect, respond to, and/or indicate the position of an object (not shown) with respect to the sensor 10. As shown, the sensor 10 generally includes a casing 12, an actuator 14, and a detector 16.

The casing 12 provides an attachment point for the sensor 10 as well as the various components included in the sensor 10. The casing 12 may be manufactured from any material suitable for the intended environment. For example, the casing 12 may be made from plastic, wood, aluminum, copper, steel, or any suitable material known to one of ordinary skill in the art. The casing 12 may define one or more water resistant or waterproof chambers. For example, as shown in FIG. 1, the casing 12 may define first and second water resistant chambers 18, 20. The first and second water resistant chambers 18, 20 are adjacent to one another. The casing 12 may include a wall 22 between the water resistant chambers 18, 20 to separate the chambers. In alternate embodiments, the first and second water resistant chambers 18, 20 may be combined into a single water resistant chamber. In this manner, the water resistant chambers 18, 20 defined by the casing 12 protect the actuator 14 and detector 16 from harsh environmental conditions.

Figure 2:
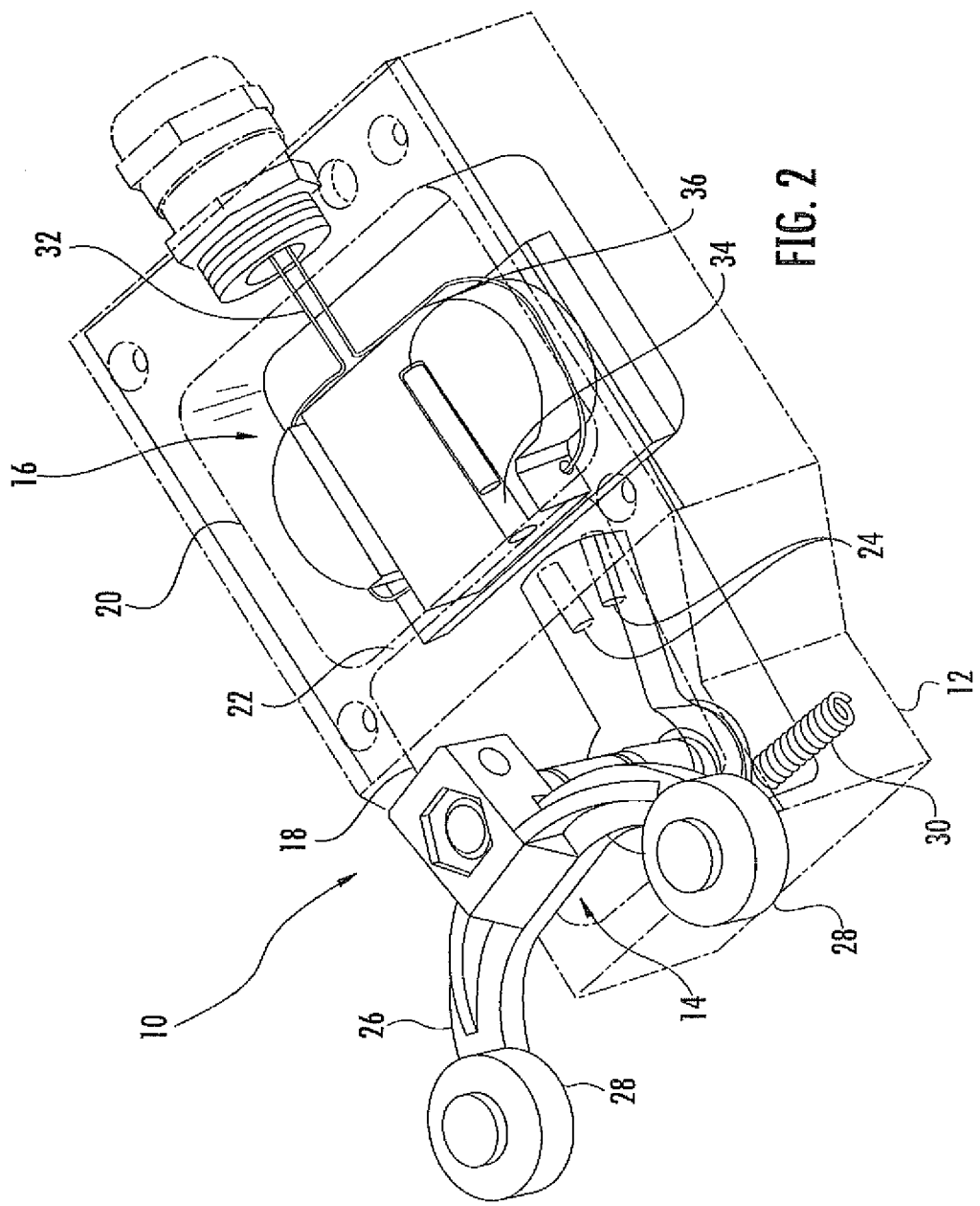
FIG. 2 is a perspective view of the sensor shown in FIG. 1 in a different position.

The actuator 14 provides the operative interface between the object being sensed and the detector 16 and transmits movement by the object to the detector 16. The actuator 14 may reside inside or outside of the first water resistant chamber 18. For example, as shown in FIGS. 1 and 2, the actuator 14 may reside partly inside and partly outside of the first water resistant chamber 18. In alternate embodiments, the actuator 14 may reside completely inside or completely outside of the first water resistant chamber 18. The actuator 14 may include means for transmitting movement by the object to the detector 16. The means for transmitting movement functions to communicate specific movement from the object to the detector 16 and may include any suitable structure known in the art for receiving and communicating such movement. For example, as shown in FIGS. 1 and 2, the means for transmitting movement may include actuator magnets 24 connected to an arm 26 that allows the actuator 14 to rotate in response to movement by the object. For example, the object may come into contact with rollers 28 connected to the arm 26 to slightly rotate the arm 26 and reposition the actuator magnets 24 to a new position, for example as shown in FIG. 2. In particular embodiments, the actuator 14 may include a spring 30 or other biasing means for biasing the actuator 14 in a particular direction or position.

The detector 16 provides the operative interface between the actuator 14 and associated control circuitry (not shown). The detector 16 may reside inside or outside the second water resistant chamber 20. For example, as shown in FIGS. 1 and 2, the detector 16 may predominately reside inside the second water resistant chamber 20, with optical wires 32 extending from the detector 16. The detector 16 defines a bore 34, and a detector magnet 36 inside the bore 34 may move in the bore 34 from a first position to a second position. The detector 16 is generally proximate to the actuator 14. As used herein, "proximate" is defined relative to the magnetic fields between the actuator magnets 24 and the detector magnet 36, and the detector 16 is considered to be proximate to the actuator 14 when the detector magnet 36 is within the magnetic field created by the actuator magnets 24 in both the first and second positions. In addition, the detector 16 is generally mechanically isolated from the actuator 14. As used herein, "mechanically isolated" is defined to mean that there is no direct physical contact between the detector 16 and the actuator 14.

FIGS. 1 and 2 illustrate the operation of the sensor 10. FIG. 1 shows the sensor 10 in a first position in which the spring 30 biases the actuator 14 in a counterclockwise direction so that the actuator magnet 24 on the right is aligned with the detector magnet 36 in the detector 16. In the example shown in FIG. 1, the actuator magnet 24 on the right is oriented to attract the detector magnet 36. As a result, the detector magnet 36 slides in the bore 34 toward the wall 22, if present, and the actuator 14 until the detector magnet 36 reaches a first position. At the first position, the detector magnet 36 acts as a shutter and blocks an optical signal being transmitted through the optical wire 32. When the object moves, contact between the object and the actuator 14 overcomes the biasing force provided by the spring 30 and rotates the actuator 14 clockwise to the position shown in FIG. 2. In the example shown in FIG. 2, when the object contacts the actuator 14, the actuator magnet 24 on the left is oriented to repel the detector magnet 36. As a result, the detector magnet 36 slides in the bore 34 away from the wall 22, if present, and the actuator 14 until the detector magnet 36 reaches a second position. At the second position, the detector magnet 36 again acts as a shutter, this time allowing passage of the optical signal being transmitted through the optical wire 32.

Figure 3:
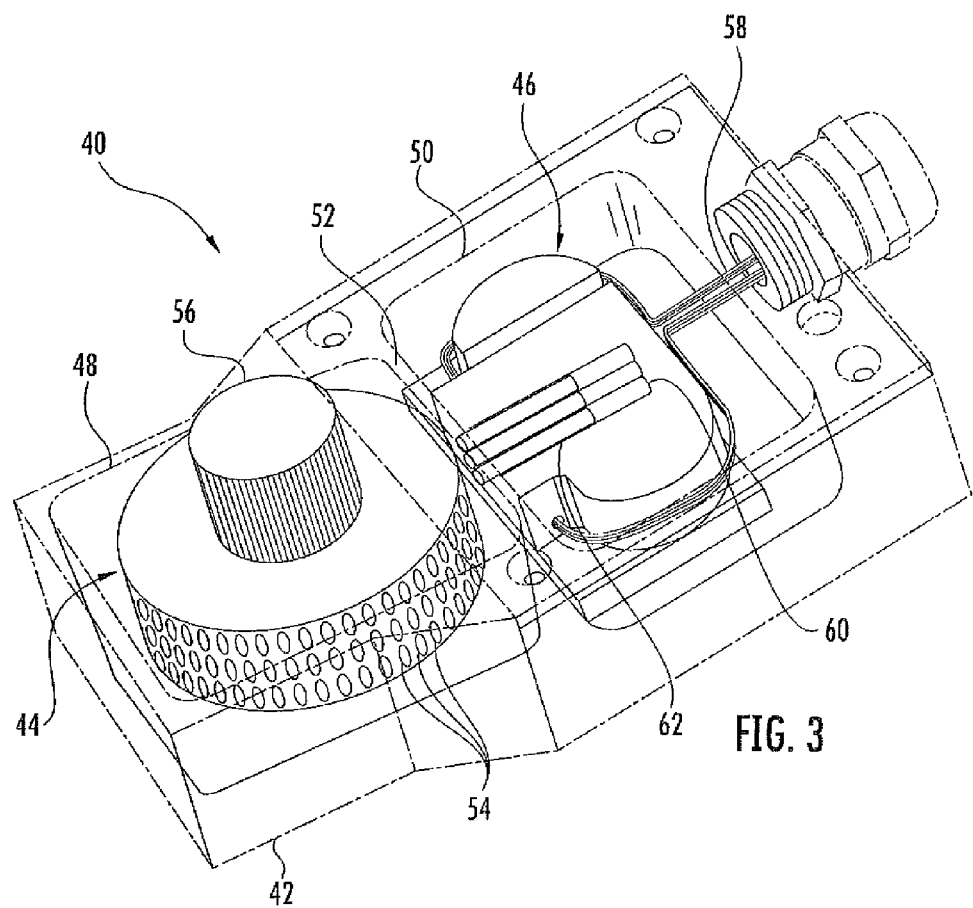
FIG. 3 is a perspective view of a sensor according to a second embodiment of the present invention.

FIG. 3 shows a sensor 40 according to an alternate embodiment of the present invention. This embodiment generally includes a casing 42, an actuator 44, and a detector 46 as previously described. Specifically, the casing 42 may define one or more water resistant or waterproof chambers. For example, as shown in FIG. 3, the casing 42 may define first and second water resistant chambers 48, 50. The first and second water resistant chambers 48, 50 are again adjacent to one another, and the casing 42 may include a wall 52 between the water resistant chambers 48, 50 to separate the chambers.

In alternate embodiments, the first and second water resistant chambers 48, 50 may be combined into a single water resistant chamber. In this manner, the water resistant chambers 48, 50 defined by the casing 42 protect the actuator 44 and detector 46 from harsh environmental conditions.

The actuator 44 again provides the operative interface between the object being sensed and the detector 46 and transmits movement by the object to the detector 46. In addition, the actuator 44 may reside partially or completely inside or outside of the first water resistant chamber 46. The actuator 44 may include means for transmitting movement by the object to the detector 46. The means for transmitting movement functions to communicate specific movement from the object to the detector 46 and may include any suitable structure known in the art for receiving and communicating such movement. For example, as shown in FIG. 3, the means for transmitting movement may include actuator magnets 54 connected to an arm 56 that allows the actuator 44 to fully rotate in response to movement by the object. In this particular embodiment, the actuator magnets 54 are arranged both horizontally and vertically. As the object contacts the arm 56, the arm 56 may fully rotate to reposition the actuator magnets 54.

The detector 46 again provides the operative interface between the actuator 44 and associated control circuitry (not shown). The detector 46 may reside partially or completely inside or outside of the second water resistant chamber 50, with optical wires 58 extending from the detector 46. In this embodiment, the detector 46 defines a plurality of bores 60, with a detector magnet 62 inside each bore 60 that may move in each bore 60 from a first position to a second position. The detector 46 is generally proximate to and mechanically isolated from the actuator 44, as previously described.

The operation of the sensor 40 shown in FIG. 3 is similar to that of the sensor 10 previously described with respect to FIGS. 1 and 2. Specifically, when the object moves, contact between the object and the actuator 44 rotates the actuator 44, changing the magnetic field between the actuator magnets 54 and the detector magnets 62. As a result, the detector magnets 62 slide in the bores 60 either toward or away from the actuator 44 to block or permit the transmission of an optical signal through each optical wire 58. A control system (not shown) connected to the detector 46 may then interpret the presence or absence of the optical signals to determine the position of the actuator 44, and thus the object.

Figure 4:
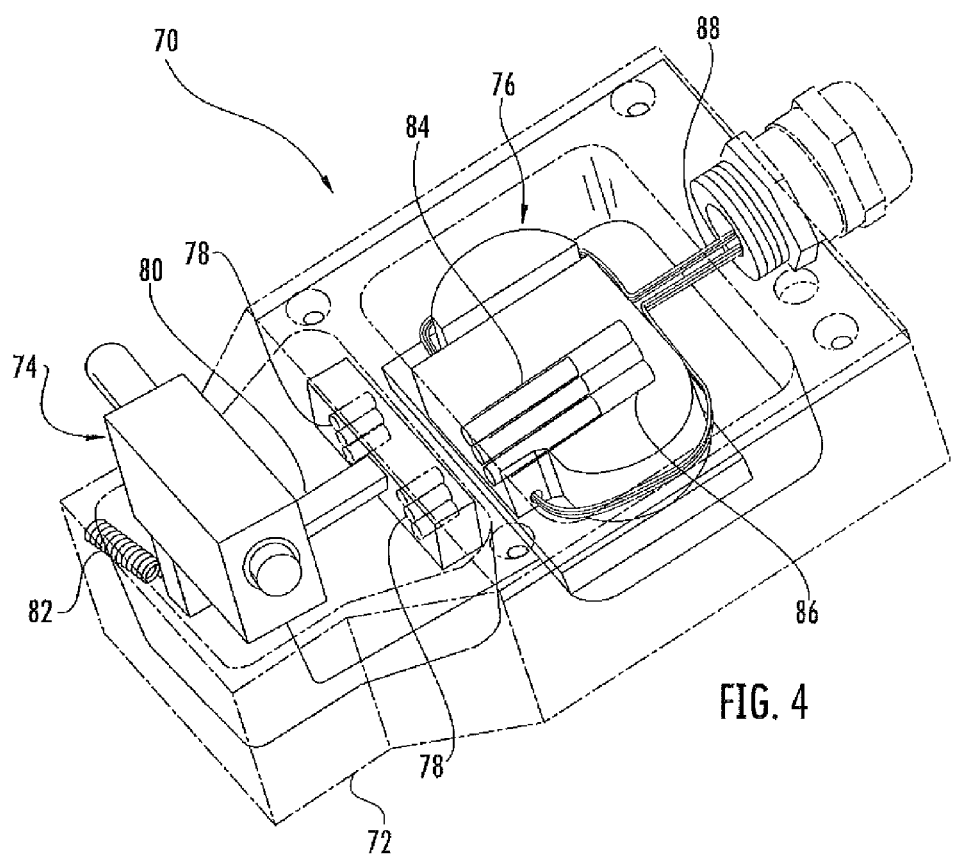
FIG. 4 is a perspective view of a sensor according to a third embodiment of the present invention.

FIG. 4 shows a sensor 70 according to a third alternate embodiment of the present invention. This embodiment generally includes a casing 72, an actuator 74, and a detector 76 as previously described with respect to the embodiments shown in FIGS. 1, 2, and 3, and only the substantive differences will be described. Specifically, the actuator 74 may include means for transmitting linear movement by the object to the detector 76. The means for transmitting linear movement may again include actuator magnets 78 connected to an arm 80 that allows the actuator 74 to move linearly in response to movement by the object. As with the embodiment described and illustrated with respect to FIGS. 1 and 2, the actuator 74 may include a spring 82 or other biasing means for biasing the actuator 74 in a particular direction or position.

The operation of the sensor 70 shown in FIG. 4 is similar to that of the sensor 10 previously described with respect to FIGS. 1 and 2. Specifically, the spring 82 biases the actuator 74 in one direction so that the actuator magnets 78 on the right are aligned with detector magnets 84 in the detector 76. In the example shown in FIG. 4, the actuator magnets 78 on the right are oriented to attract the detector magnets 84. As a result, the detector magnets 84 slide in bores 86 toward the actuator 74 until the detector magnets 84 reach a first position. At the first position, the detector magnets 84 act as a shutter and block an optical signal being transmitted through optical wires 88. When the object moves, contact between the object and the actuator 74 overcomes the biasing force provided by the spring 82 and moves the actuator 74 linearly so that the actuator magnets 78 on the left are oriented to repel the detector magnets 84. As a result, the detector magnets 84 slide in the bores 86 away from the actuator 74 until the detector magnets 84 reach a second position. At the second position, the detector magnets 84 again act as a shutter, this time allowing passage of the optical signals being transmitted through the optical wires 88.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A sensor comprising:
    a. an actuator, wherein the actuator includes a plurality of actuator magnets;
    b. a detector proximate to and mechanically isolated from the actuator, wherein the detector defines a bore;
    c. a detector magnet inside the bore, wherein the detector magnet may move in the bore from a first position to a second position;
    d. an optical signal that passes through the detector;
    e. wherein the detector magnet blocks the optical signal when the detector magnet is in the first position.

2. The sensor as in claim 1, further including a water resistant chamber, wherein at least a portion of the actuator or detector is inside the water resistant chamber.

3. The sensor as in claim 1, wherein the actuator is configured to move linearly with respect to the detector.

4. The sensor as in claim 1, wherein the actuator is configured to rotate with respect to the detector.

5. The sensor as in claim 1, wherein the actuator is biased in a direction.

6. The sensor as in claim 1, wherein the detector defines a plurality of bores.

7. The sensor as in claim 6, further including a plurality of detector magnets, wherein at least one of the plurality of detector magnets is in each of the plurality of bores.

8. The sensor as in claim 6, further including a plurality of optical signals that pass through the detector.

9. A sensor comprising:
    a. a first chamber, wherein the first chamber is water resistant;
    b. an actuator at least partially inside the first chamber, wherein the actuator includes a plurality of actuator magnets;
    c. a second chamber adjacent to the first chamber, wherein the second chamber is water resistant;
    d. a detector at least partially inside the second chamber and mechanically isolated from the actuator, wherein the detector defines a bore;
    e. a detector magnet inside the bore, wherein the detector magnet may move in the bore from a first position to a second position;
    f. an optical signal that passes through the inside of the second chamber;
    g. wherein the detector magnet blocks the optical signal when the detector magnet is in the first position.

10. The sensor as in claim 9, wherein the actuator is configured to move linearly with respect to the detector.

11. The sensor as in claim 9, wherein the actuator is configured to rotate with respect to the detector.

12. The sensor as in claim 9, wherein the actuator is biased in a direction.

13. The sensor as in claim 9, wherein the detector defines a plurality of bores.

14. The sensor as in claim 13, further including a plurality of detector magnets, wherein at least one of the plurality of detector magnets is in each of the plurality of bores.

15. The sensor as in claim 13, further including a plurality of optical signals that pass through the inside of the second chamber.

16. A sensor comprising:
    a. a casing, wherein the casing defines first and second water resistant chambers;
    b. an actuator at least partially inside the first water resistant chamber, wherein the actuator includes a plurality of actuator magnets;
    c. a detector at least partially inside the second water resistant chamber and mechanically isolated from the actuator, wherein the detector defines a bore;
    d. a detector magnet inside the bore, wherein the detector magnet may move in the bore from a first position to a second position;
    e. an optical signal that passes through the inside of the second chamber;
    f. wherein the detector magnet blocks the optical signal when the detector magnet is in the first position.

17. The sensor as in claim 16, wherein the actuator is configured to rotate with respect to the detector.

18. The sensor as in claim 17, wherein the detector defines a plurality of bores.

19. The sensor as in claim 18, further including a plurality of detector magnets, wherein at least one of the plurality of detector magnets is in each of the plurality of bores.

20. The sensor as in claim 18, further including a plurality of optical signals that pass through the inside of the second chamber.

* * * * *